United States Patent Office 2,971,637
Patented Feb. 14, 1961

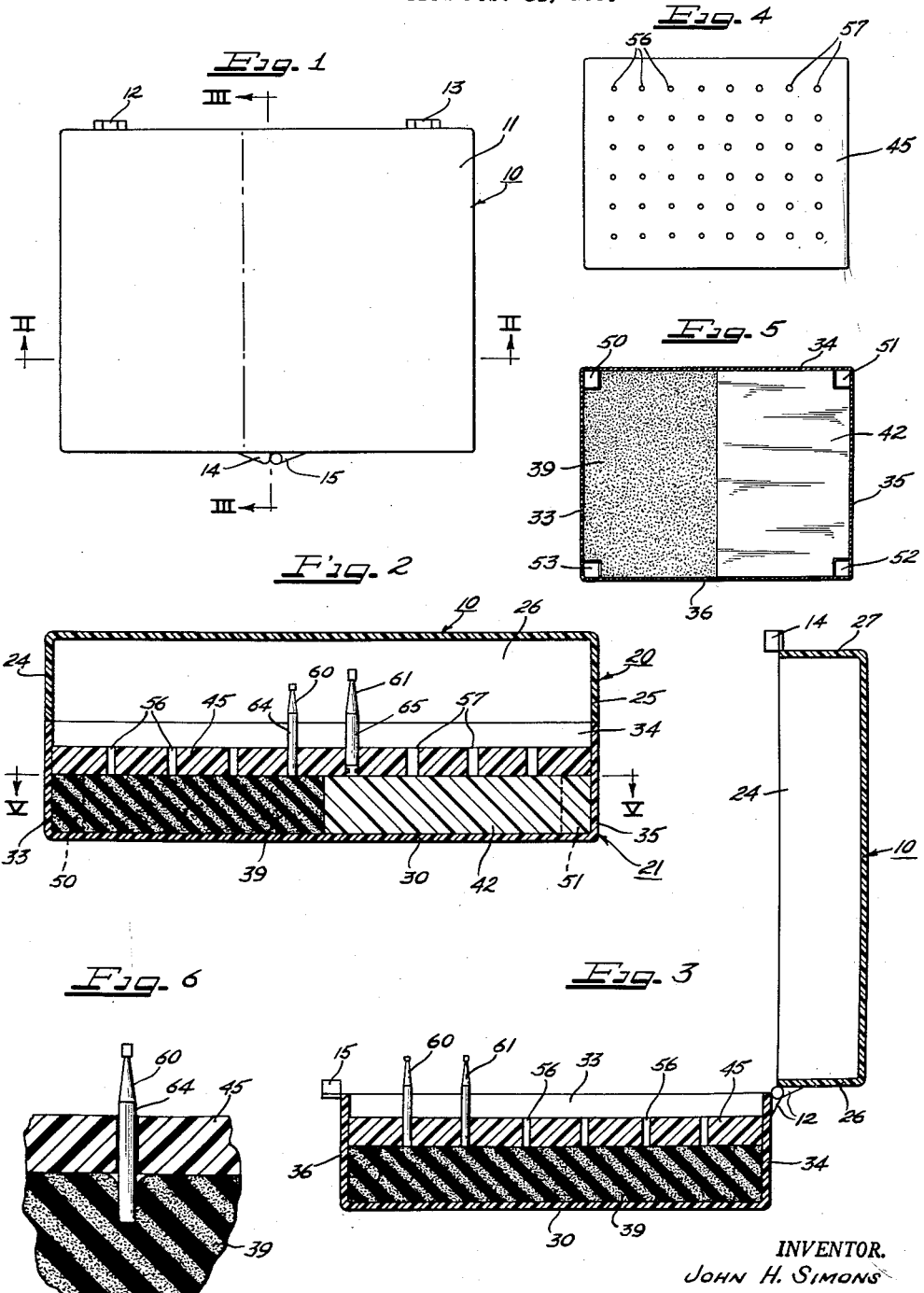

2,971,637
DENTAL BUR HOLDER

John H. Simons, 5962 NE. Circle Ave., Chicago, Ill.

Filed Feb. 11, 1959, Ser. No. 792,573

3 Claims. (Cl. 206—17)

The present invention relates to dental bur holders, and more particularly to dental bur holders for use with high speed frictionally engaged dental burs.

Modern dental techniques require high speed drilling apparatus for effecting efficient and comfortable cavity preparation. The most recent advance in this field has been the introduction of compressed air driven dental burs at speeds of between 100,000 to 250,000 r.p.m. The extremely high speed of rotation of the dental bur reduces vibration, bone conducted noise and heat to alleviate tension in the patient, while yet decreasing the time for cavity preparation on the part of the dentist.

The dentist requires a convenient holder to keep his dental burs instantly available in a neat and compact arrangement, while yet free from dust or other airborne dirt particles.

As an integral part of the high speed drilling apparatus above described, the dental bur itself is designed to have its shank frictionally engaged in a chuck. In order to facilitate insertion of the shank of the dental bur into the chuck, a thin film of lubricant should be spread over the surface of the shank. In the past, it has been the practice of dentists to immerse the shank in a tray of lubricant after removal of the bur from holders. The inconvenience of this practice with its attendant dripping of lubricant on trays and clothing makes this technique undesirable.

It is an object of the present invention to provide a dental bur holder which holds the burs available for instant use and affords a simple and easy way to lubricate the bur shanks.

It is another object of the present invention to provide a dental bur holder which enables the dentist to lubricate the dental bur before removal from the holder with a minimum of effort.

It is yet another object of the present invention to provide a dental bur holder which is attractive in appearance, simple to use and overcomes the deficiencies of the prior art bur holders.

The present invention is, therefore, directed to a novel dental bur holder comprising a liquid tight container having a perforated plate spaced from its bottom and a lubricant filled pad disposed between the plate and the bottom of the container.

The above and further objects, features and advantages of this invention will be recognized by those familiar with the art from the following description of a preferred embodiment thereof, as illustrated in the accompanying drawing, in the several figures of which like numerals indicate like elements, and in which:

Figure 1 is a top plan view of the container;

Figure 2 is a cross-sectional elevational view of the bur holder taken along lines II—II of Figure 1;

Figure 3 is a cross-sectional elevational view of the bur holder taken along lines III—III of Figure 1 with the top of the container raised to an open position;

Figure 4 is a top plan view of the perforated plate;

Figure 5 is a top view of the lower portion of the holder taken along lines V—V of Figure 2; and Figure 6 is a detail fragmentary view of a dental bur being forced into the pad for lubrication purposes.

The novel features of the present invention may be described more fully with reference to the figures in the drawing. Referring now to Figure 1, there is therein shown a top plan view of theb ur holder 10, having a top wall 11. As will become more evident from a subsequent figure, bur holder 10 comprises a rectangular hollow container made of two identical hollow open boxes hinged together along one of their mating edges by spaced hinges 12 and 13 and having their open ends facing one another. In addition, the container may be held closed in a dust tight condition by two interlocking elements 14 and 15. The bottom, top and sidewalls of container 10 may be made of thin sheets of polystyrene or other suitable thin-walled material.

The relationship of the container 10, the perforated plate and the lubricant filled pad is more clearly shown in Figure 2. As therein shown, container 10 comprises a top portion or box 20 and a bottom portion or box 21. As previously described each of boxes 20 and 21 is rectangular with an open end, and the open ends face each other. The boxes 20 and 21 are connected by hinges 12 and 13 (Figure 1) along their rear mating edges and may be held together to form a dust tight container by interlocking elements 14 and 15, one of which is attached near the center of the lower front edge of top box 20 and the other near the center of the upper front edge of bottom box 21.

Top box 20 comprises a top wall II of generally rectangular shape with four depending sidewalls 24–27 (the latter being shown in Figure 3). Sidewalls 24–27 are of equal length and are integral at their upper edges with top wall 11 and at their respective mating edges with each other.

In like manner, lower box 21 comprises a bottom wall 30 of rectangular shape and an area equal to that of top wall 11. Upstanding sidewalls 33–36 (the latter being shown in Figure 3) are of equal length and are made integral at their lower edges with bottom wall 30 and at their respective mating edges.

Disposed within bottom box 21 and resting on the inner surface of bottom wall 30 is a pad 39 of resilient sponge-like material such as polyeurthene. Pad 39 may be one-half as thick as the depth of box 21 and is about one-half as long as bottom wall 30, filling about one-half of box 21. The other half of the bottom of box 21 is covered by a filler 42 of rectangular rigid plastic material, preferably polystyrene, having a depth equal to that of pad 39.

A plate 45 of rigid plastic material, such as polystyrene, is placed above the pad 39 and filler 42 such that its under surface rests thereon. The area of pad 45 is sufficient to fit tightly within the box 21. To directly support plate 45 there are provided four support members 50–53 (shown in greater detail in Figure 5). Support members 50–53 are of a height equal to that of the thickness of pad 39 and filler 42. Support members 50–53 are attached to bottom wall 30 and to adjoining respective sidewalls of box 21. As may be seen in Figure 5, both pad 39 and filler 42 have square portions cut out at their outer ends to accommodate the support members 50–53.

Plate 45 has drilled therein a plurality of holes 56 and 57. Holes 56 and 57 extend transversely of plate 45 to receive the dental burs such as 60 and 61. Holes 56 and 57 are of different diameter to accommodate different size dental burs. Dental bur 60 is of the type having a shank 64 of uniform diameter which is used with a friction chuck, and is the type which must be lubricated. Bur 61 has a shank 65 of slightly greater diameter than that of shank 64 and is of the type used in more conventional drill chucks wherein the shank of the bur must be keyed to fit a mating chuck. The latter bur needs no lubrication and so pad 39 is replaced by the filler 42 which serves merely to support the bur in a convenient position so that it is readily accessible to the dentist.

Figure 4 is a top plan view of plate 45 and shows a preferred alignment of holes 56 and 57.

At this point, it is evident that the bur holder of the present invention provides a means for keeping dental burs in a dust tight container, while yet allowing free and convenient access to the burs. The burs are held apart from one another and may be easily grasped for removal upon opening the holder.

The purpose and function of the lubricating pad 39 may be easily seen from Figure 6 which shows a dental bur 60 being pressed downwardly until its shank 64 depresses lubricant pad 39. Pad 39 is of soft resilient material and a depression is formed therein whose walls encompass the shank 64 and apply thereto an evenly thin film of lubricant. The lubricant used in the preferred embodiment is mineral oil or detergent.

While the preferred embodiment shows a dental bur holder useful for both new and older type dental burs, it should be realized that filler 42 is not essential and that pad 39 may extend to fill the bottom of box 21.

Furthermore, support members 50–53 may be omitted and plate 45 may rest upon pad 39 for support. In this case plate 45 is made long enough and wide enough so that it is partially supported by being press fitted against the upstanding walls 33–36 of lower box 21.

While what has been described is regarded to be a preferred embodiment of the invention, it will be apparent that variations, rearrangements and modifications may be made therein without departing from the present invention as defined by the appended claims.

I claim:

1. A holder for dental burs comprising a liquid tight container having a bottom wall and upwardly extending sidewalls integral with each other and with said bottom wall, a perforated plate in spaced parallel relation with respect to said bottom wall for receiving said dental burs, support members contacting said plate for maintaining said spacing, and a lubricant receiving pad disposed between said plate and said bottom wall, said pad serving to support said dental burs in said perforations.

2. A holder for dental burs comprising a liquid tight container having a bottom wall, a perforated plate spaced from said bottom wall for receiving dental burs, a lubricant receiving pad covering only a part of said bottom wall disposed between said plate and said bottom wall and a rigid filler plate covering the remainder of said bottom wall disposed between said plate and said bottom wall.

3. A holder for dental burs as recited in claim 2 in which the bottom of said container further has upstanding support members attached thereto for supporting said plate in its spaced relationship, and said pad and said filler have cut out portions to accommodate said support members.

References Cited in the file of this patent

UNITED STATES PATENTS

| 388,334 | Bartlett | Aug. 21, 1888 |
| 2,518,450 | Owen | Aug. 15, 1950 |

FOREIGN PATENTS

| 407,104 | France | Dec. 22, 1909 |